(12) United States Patent
Yamamoto

(10) Patent No.: US 8,189,241 B2
(45) Date of Patent: May 29, 2012

(54) IMAGE READING APPARATUS AND LIGHT SOURCE

(75) Inventor: Hiroyuki Yamamoto, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 666 days.

(21) Appl. No.: 12/395,951

(22) Filed: Mar. 2, 2009

(65) Prior Publication Data

US 2009/0231640 A1    Sep. 17, 2009

(30) Foreign Application Priority Data

Mar. 14, 2008 (JP) ................. 2008-066466

(51) Int. Cl.
*H04N 1/04* (2006.01)
*F21V 7/00* (2006.01)

(52) U.S. Cl. ...... 358/493; 358/475; 362/84; 362/217.02; 362/217.09; 250/208.1; 250/239

(58) Field of Classification Search .............. 358/475, 358/474, 493, 494, 509; 362/217.07, 217.02, 362/84; 355/67–71; 399/220, 221; 250/208.1, 250/239
See application file for complete search history.

(56) References Cited

U.S. PATENT DOCUMENTS

| | | | | |
|---|---|---|---|---|
| 4,769,718 A | * | 9/1988 | Imamura | 358/482 |
| 4,779,121 A | * | 10/1988 | Okumura | 355/68 |
| 5,075,720 A | * | 12/1991 | Takeda et al. | 355/67 |
| 5,096,607 A | * | 3/1992 | Mowrey-McKee et al. | 422/28 |
| 5,598,067 A | | 1/1997 | Vincent et al. | |
| 5,950,053 A | * | 9/1999 | Lin | 399/220 |
| 6,037,582 A | * | 3/2000 | Youngers et al. | 250/234 |
| 6,249,368 B1 | * | 6/2001 | Hsu | 359/212.1 |
| 6,677,580 B1 | * | 1/2004 | Sano et al. | 250/239 |
| 7,443,550 B2 | * | 10/2008 | Huang et al. | 358/475 |
| 8,035,868 B2 | * | 10/2011 | Kaneko | 358/475 |
| 2003/0164995 A1 | * | 9/2003 | Hsu et al. | 358/509 |
| 2004/0026602 A1 | * | 2/2004 | Chen | 250/208.1 |
| 2006/0268275 A1 | | 11/2006 | Niida et al. | |
| 2008/0316548 A1 | * | 12/2008 | Yamauchi et al. | 358/475 |

FOREIGN PATENT DOCUMENTS

JP    03-283870    12/1991

(Continued)

OTHER PUBLICATIONS

Notice of Reasons for Refusal issued in the corresponding Japanese Patent Application No. 2008-066466 dated Jan. 26, 2010, and an English Translation thereof.

(Continued)

*Primary Examiner* — Twyler Haskins
*Assistant Examiner* — Dennis Dicker
(74) *Attorney, Agent, or Firm* — Buchanan Ingersoll & Rooney PC

(57) ABSTRACT

An image reading apparatus for reading an original document including: a light source including a sheet-shaped light-emitting section which includes an electroluminescence element, the light emitting section being configured to have a folded plane folded inward or a concave curved surface, and a light emitting surface being arranged inside the folded plane or the concave curved surface; and a reading element which receives light from the original document to read images while the light source illuminates a reading position of the original document along a main-scanning direction of the original document.

8 Claims, 9 Drawing Sheets

FOREIGN PATENT DOCUMENTS

| | | |
|---|---|---|
| JP | 04-112557 U | 9/1992 |
| JP | 05-328036 | 12/1993 |
| JP | 08-317133 | 11/1996 |
| JP | 09-027886 | 1/1997 |
| JP | 2000-332962 | 11/2000 |
| JP | 2000-354132 A | 12/2000 |
| JP | 2003-302713 | 10/2003 |
| JP | 2004-177851 A | 6/2004 |
| JP | 2007 013913 A | 1/2007 |
| JP | 2007-134288 A | 5/2007 |

OTHER PUBLICATIONS

Notice of Reasons for Refusal dated Nov. 9, 2010, issued in the corresponding Japanese Patent Application No. 2008-066466, and an English Translation thereof.

Notice of Reasons for Refusal issued in the corresponding Japanese Patent Application No. 2008-066466 on Jun. 15, 2010, and an English Translation thereof.

\* cited by examiner

FIG. 4
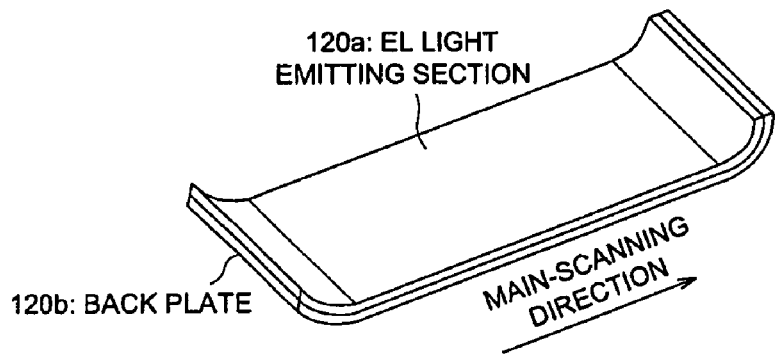
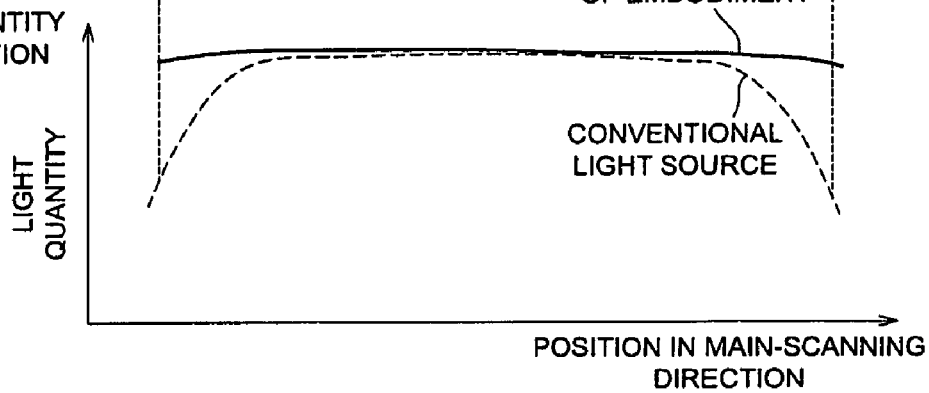
FIG. 5 (a) ORIGINAL DOCUMENT
FIG. 5 (b) LIGHT SOURCE
FIG. 5 (c) LIGHT QUANTITY DISTRIBUTION FIG. 7 (a) ORIGINAL DOCUMENT FIG. 7 (b) LIGHT SOURCE FIG. 7 (c) LIGHT QUANTITY DISTRIBUTION

MAIN-SCANNING DIRECTION

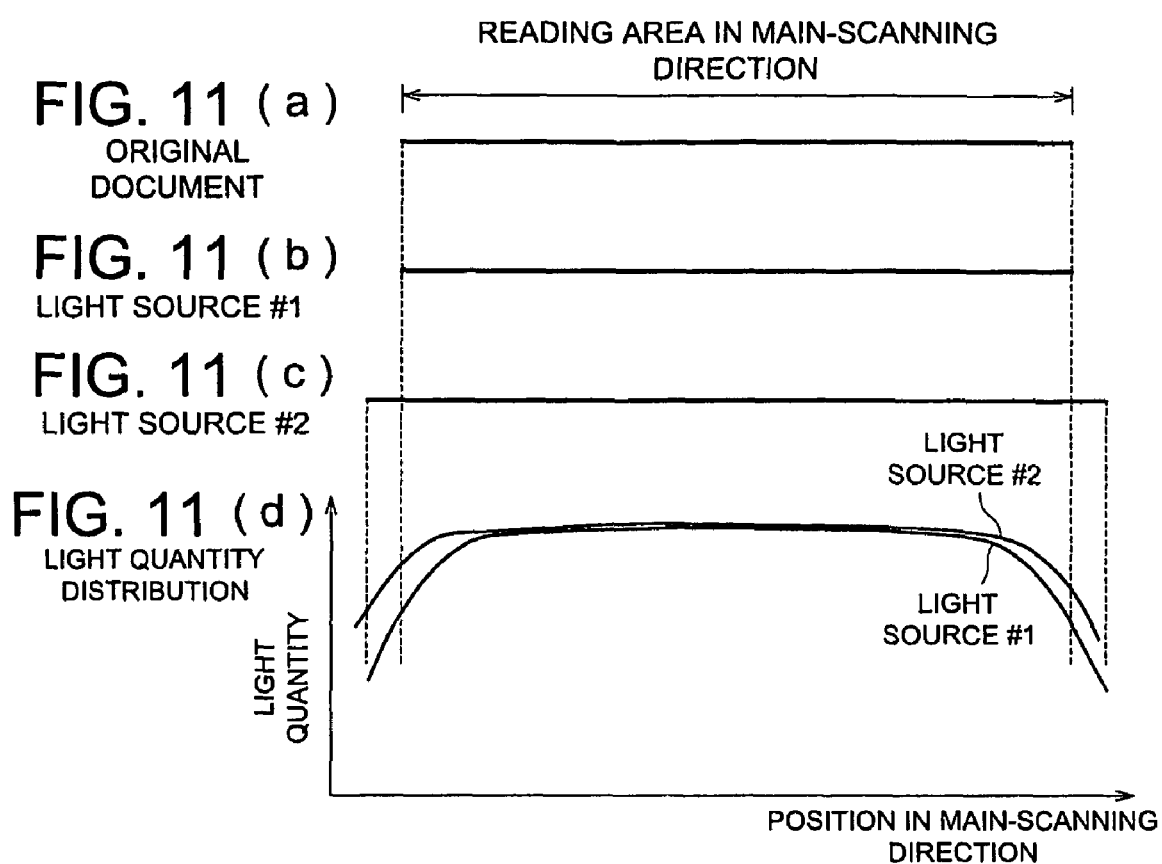

IMAGE READING APPARATUS AND LIGHT SOURCE

CROSS REFERENCE TO RELATED APPLICATION

The present application is based on Japanese Patent Application No. 2008-066466 filed with Japanese Patent Office on Mar. 14, 2008, the entire content of which is hereby incorporated by reference.

BACKGROUND OF THE INVENTION

1. Field of Technology

The present invention relates to an image reading apparatus that generates image data by reading images of an original document, and to a light source for the image reading apparatus, and in particular, to an image reading apparatus in which a decline of a light quantity at a peripheral portion is taken into consideration, and to a light source thereof.

2. Description of Prior Art

In various types of image reading apparatuses such as a copying machine, a facsimile machine and a single separate scanner, a linear reading position whose longitudinal direction is a main-scanning direction is read by a line sensor while the linear reading position is illuminated by a light source, and a surface of the original document is read by moving a light source and a line sensor or an original document in the sub-scanning direction that is perpendicular to the aforesaid main-scanning direction.

In the image reading apparatus of this kind, a decline of a light quantity on a peripheral portion on the end portion of the light source is prevented by using a light source that is slightly longer than a reading position.

FIG. 11 is a characteristic illustration wherein a reading-out area in the main-scanning direction, a size of a light source and a decline of a light quantity on a peripheral portion are compared at a position in the main-scanning direction, to be shown.

When using light source #1 (FIG. 11 (b)) having a length in the main-scanning direction that is the same as main-scanning direction for the reading-out area (FIG. 11 (a)), a light quantity sensed by a sensor is lowered extremely at an end portion in the main-scanning direction, by a terminal effect of the light source and by a characteristic of an optical system (FIG. 11 (d) #1).

Therefore, light source #2 that is shown in FIG. 11 (c) and is longer than a reading-out area is generally used in various types of scanners. In this case, a terminal effect of the light source is small, and a decline of a light quantity at an end portion in the main-scanning direction is slightly improved, as a light quantity accepted by a sensor (FIG. 11 (d) #2).

However, it is not the case where a decline of a light quantity is deterred perfectly. In addition, though a decline of a light quantity on the peripheral portion is improved more if a light source is made to be longer than a reading-out area furthermore, there is a requirement of downsizing for an apparatus, which makes it impossible to enlarge a light source so much.

Meanwhile, Patent Documents below disclose various types of proposals and improvements, regarding problems of the light source of this kind.

[Patent Document 1] Unexamined Japanese Patent Application Publication No. 2007-13913

[Patent Document 2] Unexamined Japanese Patent Application Publication No. 2007-134288

[Patent Document 3] Unexamined Japanese Patent Application Publication No. 2004-177851

[Patent Document 4] Unexamined Japanese Patent Application Publication No. 2000-354132

In disclosures of the Patent Document 1 and the Patent Document 2 above, a reflecting member is arranged in the circumference of a light source so that light that diverges from a light source may be converged to a desired illumination position.

In this case, it is necessary to mount an additional member such as a reflecting member in the circumference of a light source so that prescribed angle may be maintained. Further, if a mounting angle for this reflecting member is shifted from the prescribed angle, there occurs a problem that expected light quantity cannot be obtained.

In the disclosure of the Patent Document 3 above, a resin cap having an effect of a condensing lens is arranged on a light-emitting diode on the end portion, and light diffusion is restrained on the end portion so that condensing efficiency may be raised, in an array-shaped light-emitting diode used as a light source, for devising. In this case, additional parts such as the resin cap are required. And exclusive resin caps are needed to be prepared in agreement with the size and characteristics of the light-emitting diode.

In the disclosure of the Patent Document 4 above, a strip-shaped electroluminescence element used as a light source is constructed to be broad at both end portions so that light quantities on end portions may be increased. In this case, both end portions of the light source are made to be broad, and light quantities from the light source are increased. However, a broadened portion becomes more distant from a position to be illuminated, and illumination from a distant position does not operate so effectively, resulting finally in difficulty of realization of uniform illustration.

The invention is one achieved to solve the aforesaid problems, and its objective is to provide an image reading apparatus and a light source that can restrain a decline of a light quantity in the periphery as far as possible, without employing an optical member other than a light source, such as a reflecting member and a light converging member, and without increasing extremely a width and a length of a light source.

SUMMARY

An image reading apparatus for reading an original document, reflecting one aspect of the present invention to solve the aforesaid problems, includes: a light source having a sheet-shaped light-emitting section which comprises an electroluminescence element, the light emitting section being configured to have a folded plane folded inward or a concave curved surface, and a light emitting surface being arranged inside the folded plane or the concave curved surface; and a reading element which receives light from the original document to read images while the light source illuminates a reading position of the original document along a main-scanning direction of the original document.

An image reading apparatus reflecting the other aspect of the present invention is the above described image reading apparatus, wherein the light emitting section is folded or bent to have the folded plane folded inward or the concave curved surface such that at least a part of end portions of the sheet-shaped light emitting section is made closer to the reading position of the original document.

An image reading apparatus reflecting the other aspect of the present invention is the above described image reading apparatus, wherein the light emitting section is configured to be a form of a rectangle whose long side is in a main-scanning direction of the original document, and is folded or bent in a short side direction to have the folded plane folded inward or the concave curved surface, and the light emitting surface being arranged inside the folded plane or the concave curved surface.

An image reading apparatus for reading an original document, reflecting another aspect of the present invention to solve the aforesaid problems, includes: a light source having a sheet-shaped light-emitting section which comprises an electroluminescence element, at least a part of end portions of the sheet-shaped light emitting section being configured to have a folded plane folded inward or a concave curved surface, and a light emitting surface being arranged inside the folded plane or the concave curved surface; and a reading element which receives light from the original document to read images while the light source illuminates a reading position of the original document along a main-scanning direction of the original document.

BRIEF DESCRIPTION OF THE DRAWINGS

These and other objects, advantages and features of the invention will become apparent from the following description thereof taken in conjunction with the accompanying drawings in which.

Figure 2:
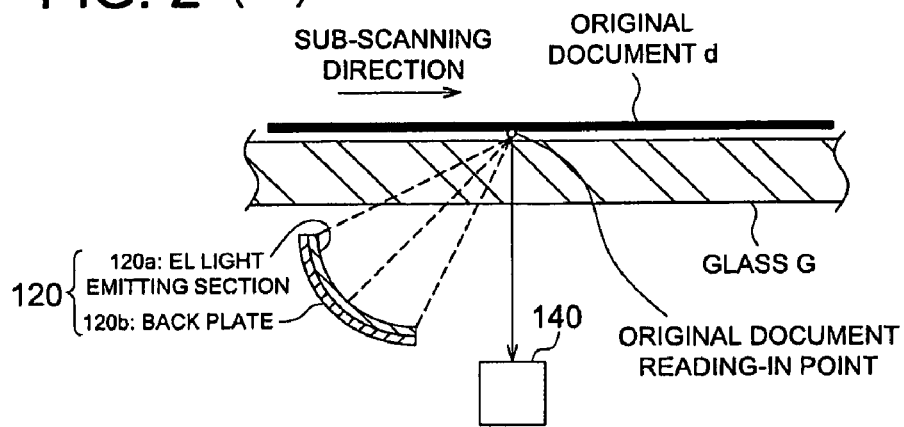
Figure 2:
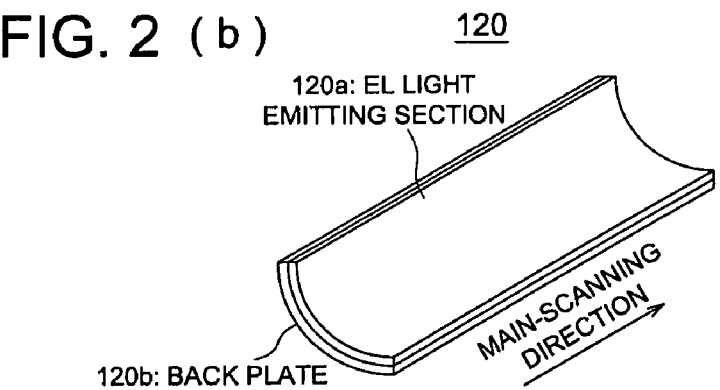
Figure 2:
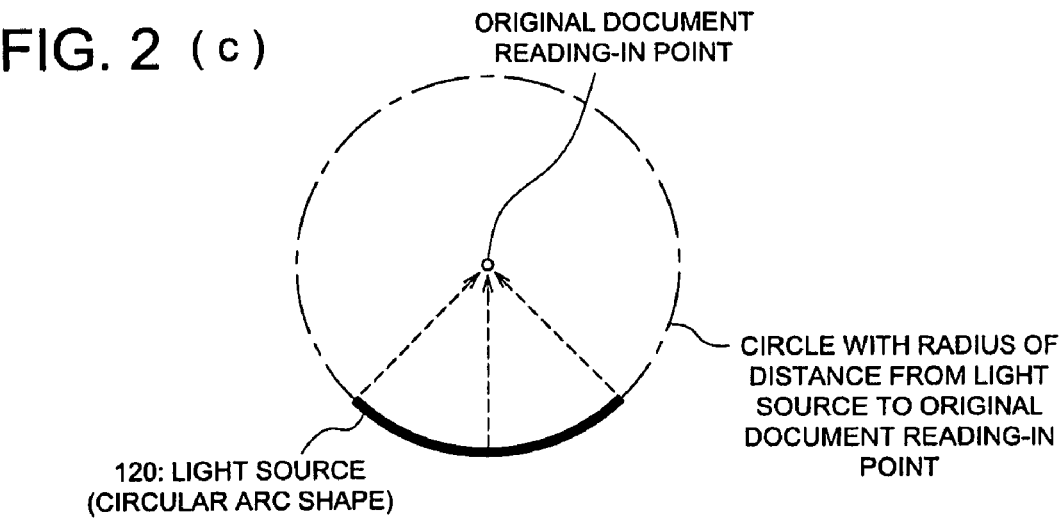
Figure 3:
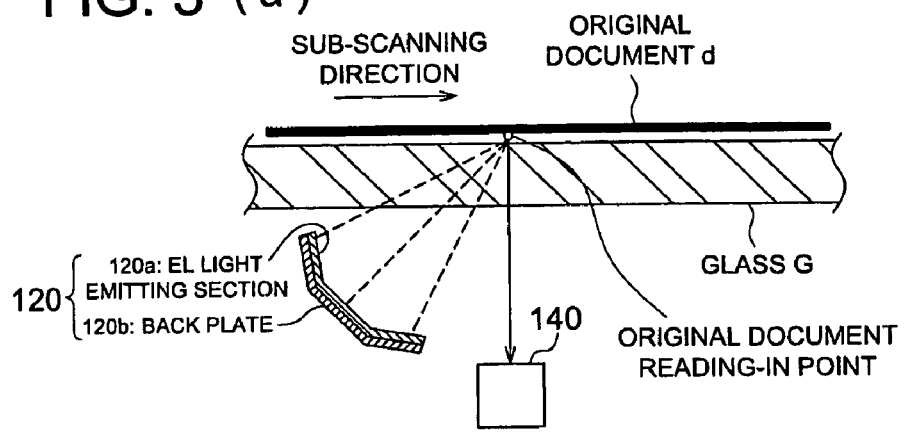
Figure 3:
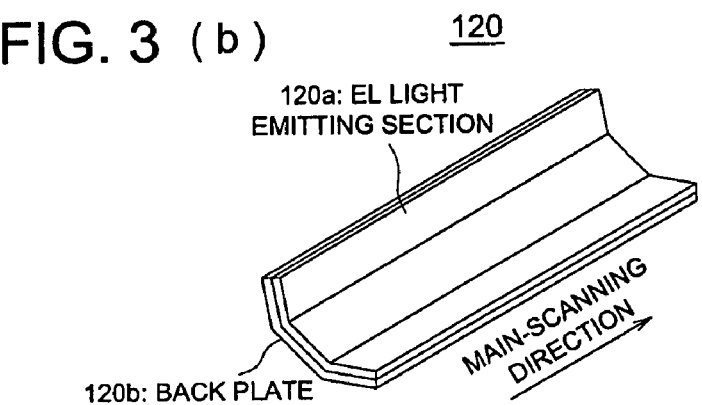
Figure 3:
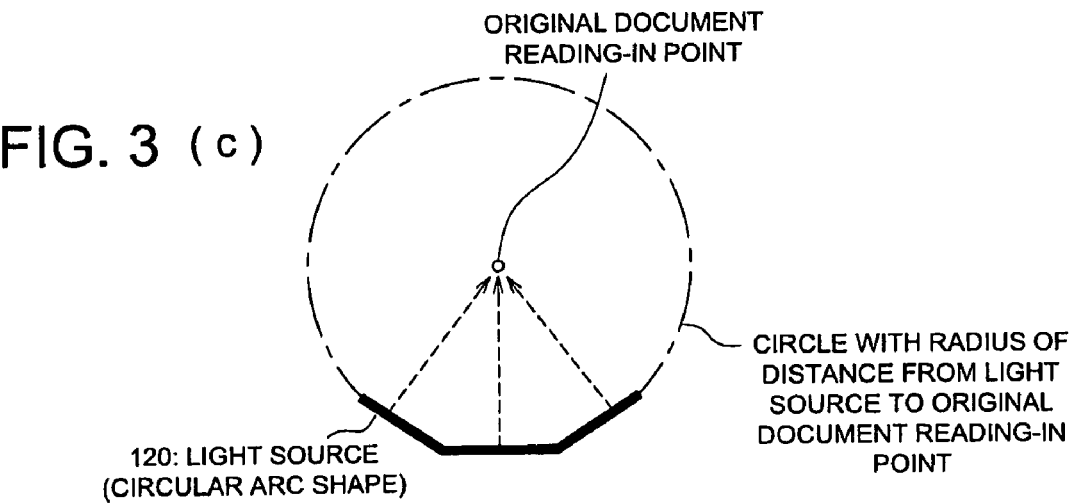
Figure 6:
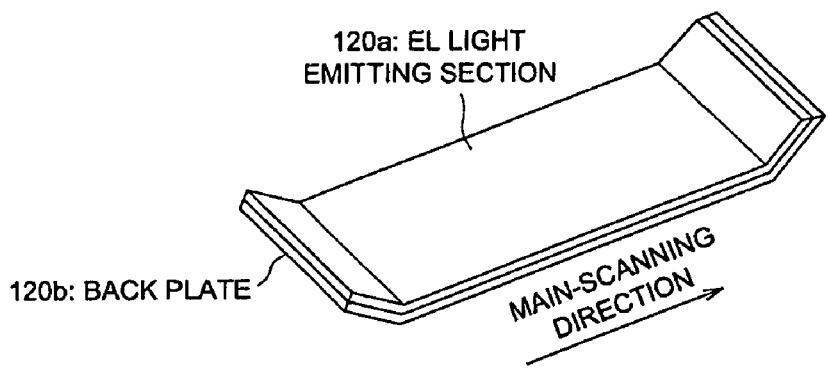
Figure 8:
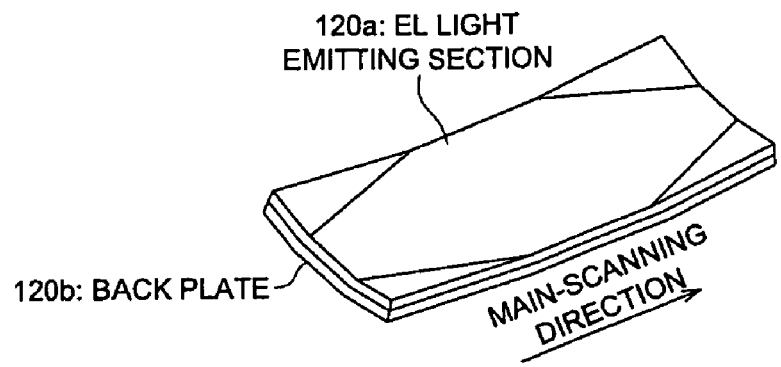
Figure 8:
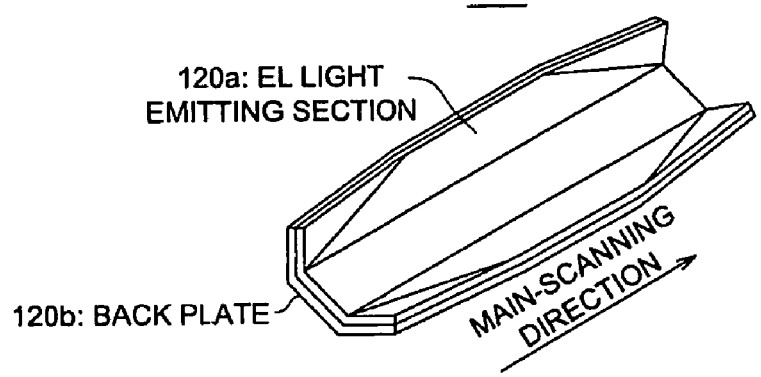
Figure 8:
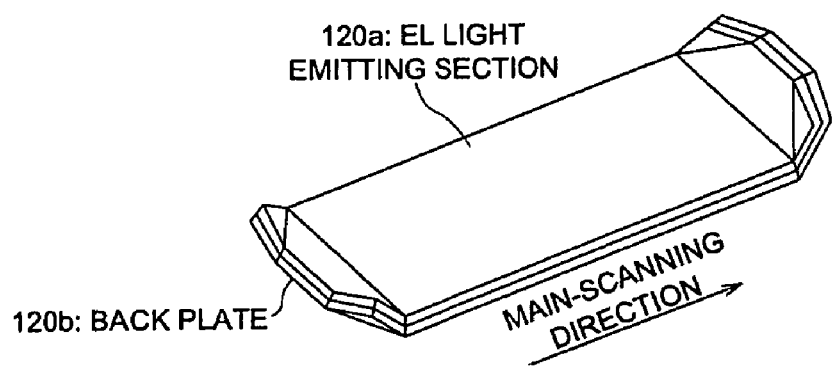
Figure 9:
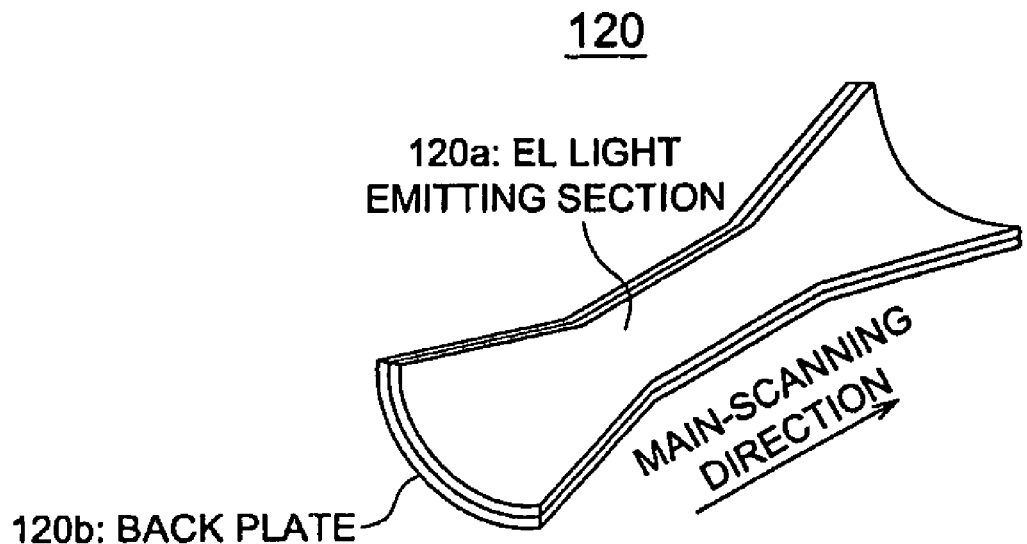
Figure 9:
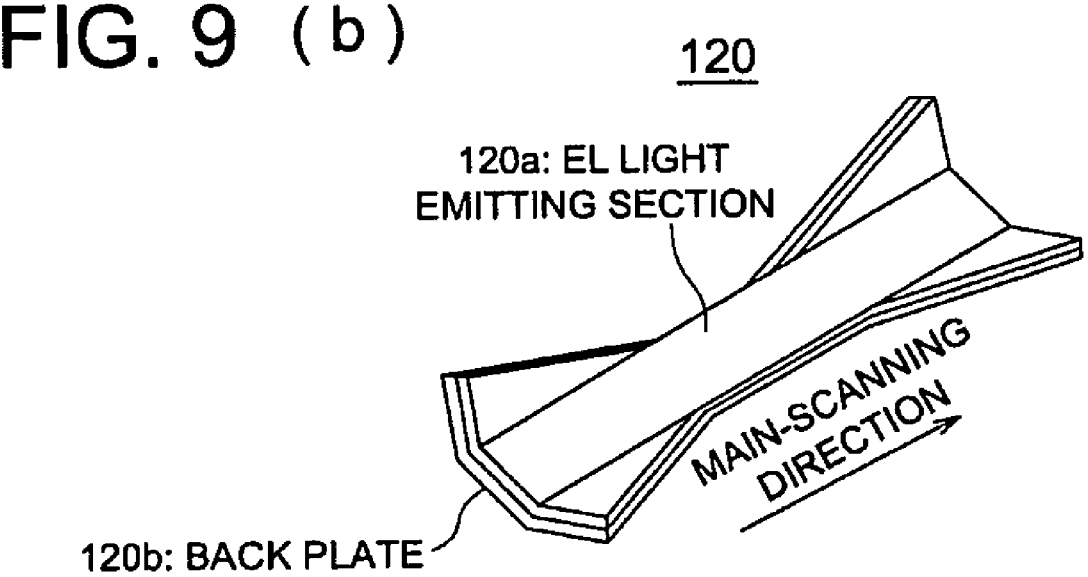
Figure 10:
Figure 10:
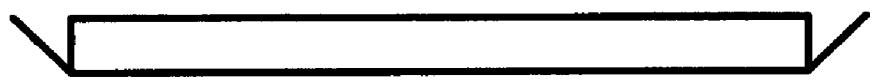
Figure 10:
Figure 10:

Each of FIGS. 2 (a)-2 (c) is an illustration diagram showing the structure of an image reading apparatus in an embodiment of the invention;

Each of FIGS. 3 (a)-3 (c) is an illustration diagram showing the structure of an image reading apparatus in an embodiment of the invention;

FIG. 4 is an illustration diagram showing the structure of an image reading apparatus in an embodiment of the invention;

Each of FIGS. 5 (a)-5 (c) is an illustration diagram showing the configuration of an image reading apparatus in an embodiment of the invention;

FIG. 6 is an illustration diagram showing the structure of an image reading apparatus in an embodiment of the invention;

Each of FIGS. 7 (a)-7 (c) is an illustration diagram showing the configuration of an image reading apparatus in an embodiment of the invention;

Each of FIGS. 8 (a)-8 (c) is an illustration diagram showing the structure of an image reading apparatus in an embodiment of the invention;

Each of FIGS. 9 (a)-9 (b) is an illustration diagram showing the structure of an image reading apparatus in an embodiment of the invention;

Each of FIGS. 10 (a)-10 (d) is an illustration diagram showing the structure of an image reading apparatus in an embodiment of the invention; and FIGS. 11 (a)-11 (d) are illustration diagrams showing characteristics of a conventional light source.

DETAILED DESCRIPTION OF THE PREFERRED EMBODIMENTS

The best mode for carrying out the invention (hereinafter referred to as an embodiment) will be explained in detail as follows, referring to the drawings. Meanwhile, it is possible to apply the embodiment of the invention even to an image reading apparatus that reads contents of an original document as image information by an original document reading section (scanner), and generates and outputs image data, and to an image forming apparatus (a copying apparatus) equipped with functions to read-in contents of an object to be copied (an original document) as image information by an original document reading section (scanner), and to copy them, and further to an image transmitting apparatus (a facsimile machine) equipped with functions to read-in contents of an object (an original document) as image information by an original document reading section (scanner), and to transmit them.

Incidentally, the present embodiment is one capable of being applied to various types of image reading apparatus wherein a light source is used when illuminating a linear reading position in an image reading apparatus, including any type among an image reading apparatus in which a light source and a sensor are fixed and an original document is conveyed for reading, and an image reading apparatus in which an original document is fixed and a light source and a sensor are moved for reading.

<Structure of Image Reading Apparatus>

Figure 1:
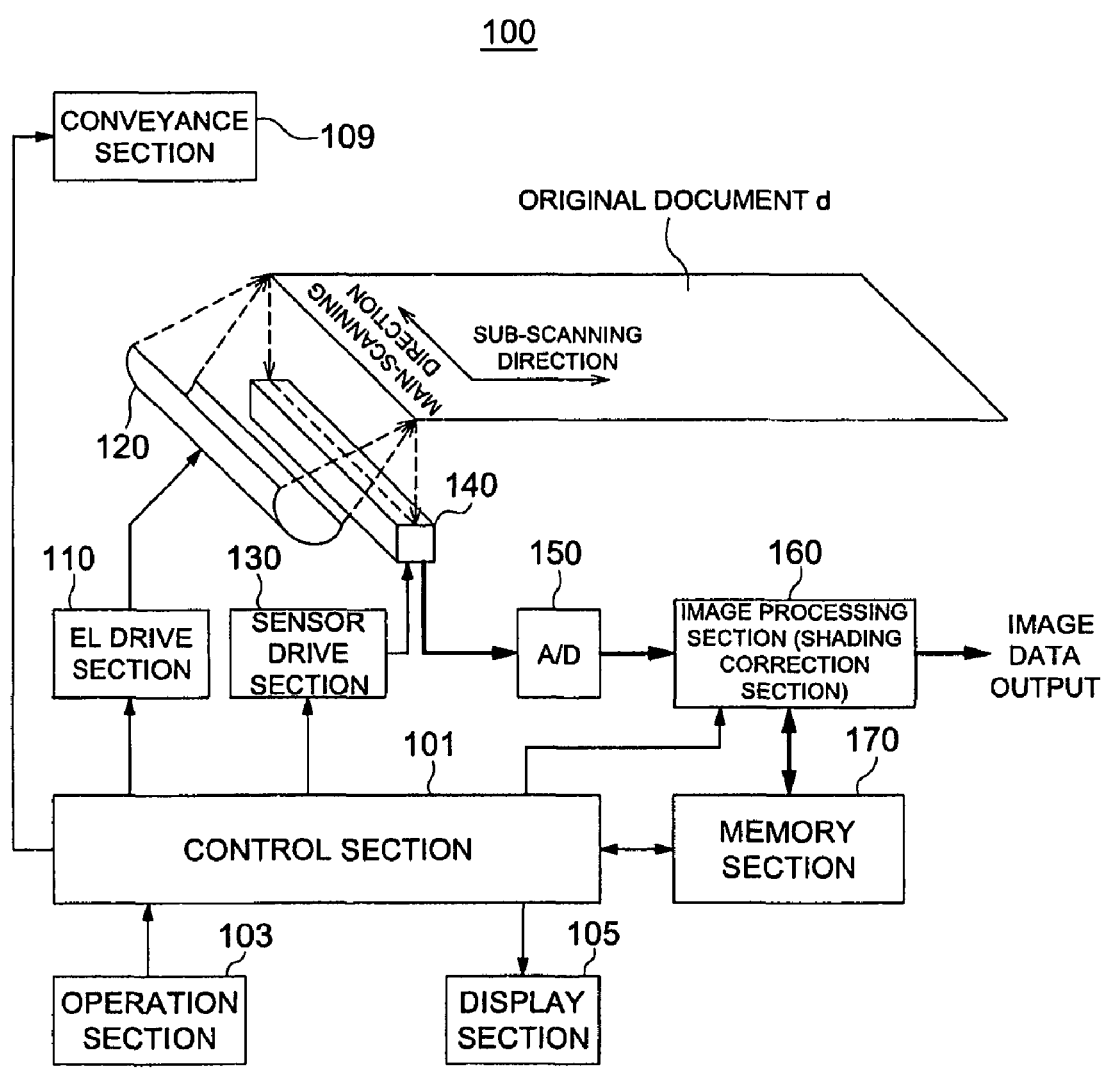
FIG. 1 is a structural diagram showing the structure of primary parts of an image reading apparatus in an embodiment of the invention.

FIG. 1 is a block diagram showing the overall structure of an image reading apparatus in an embodiment of the invention. Meanwhile, in FIG. 1, the circumstance of the portion necessary for an illustration of operations of the present embodiment are mainly described, and other portions which are already-known as an image reading apparatus (a power source circuit and a heat radiation circuit, etc.) are omitted.

In image reading apparatus 100, control section 101 is composed of CPU or the like and it operates as a control device that controls various portions.

Operation section 103 is an operation input device with which an operator (a user) inputs various types of instructions for the image reading apparatus 100. Display section 105 operates as a display device that displays various types of situations of the image reading apparatus 100 and various types of messages.

Conveyance section 109 is a conveyance device to realize reading-in in the sub-scanning direction by moving a sensor and a light source or by moving a sensor and an original document relatively.

EL driving section 110 is a driving device that drives an electroluminescence (EL) element representing a primary part of light source 120 to emit light.

As an illuminating device that illuminates a position of a linear reading position in the main-scanning direction, the light source 120 is composed of an electroluminescence element that is constituted so that at least one of a short side and a long side of a rectangle or of a form that resembles a rectangle in shape is bent to form a folded plane or a concave curved surface whose inner side is a light emitting surface.

Sensor driving section 130 is a driving device that drives linear sensor 140 which will be described later for obtaining reading-out signals corresponding to light-receiving results.

Sensor 140 is a reading element by means of a line sensor wherein the main-scanning direction is made to be a longitudinal direction for obtaining reading-out signals corresponding to results of light-receiving by converting photoelectrically light reflected from the reading position for original document d illuminated by light source 120. Further, the line sensor 140 is one composed of various types of elements such as CCD and C-MOS, and it can either be a line sensor of a close contact type or be one employing a reduction optical system.

A-D convertor 150 is a converting device that converts read-out signals obtained by sensor 140 into digital data through A-D conversion.

Image processing section 160 is an image processing device that carries out shading correction and various types of image processing. Memory section 170 is a memory device that stores image data and various types of data.

<Structure of Light Source (1)>

FIG. 2 (*a*) is a sectional view showing an arrangement of original document d, light source 120 and sensor 140, under the condition that the main-scanning direction is perpendicular to a page plane. In FIG. 2, original document d is placed on or conveyed to glass G such as a contact glass or a platen glass. Then, a position for reading-in for an original document in the main-scanning direction is illuminated by light source 120 from the lower side of the glass G. Light reflected from a reading position for original document d is converted photoelectrically by sensor 140.

In this case, the light source 120 is composed as an illumination device when illuminating a reading position on a line in the main-scanning direction so that it has a concave curved surface whose inner side surface is a light emitting surface.

Light source 120 shown in each of FIG. 2 (*a*) and FIG. 2 (*b*) indicates one wherein the rectangular form is bent in the short side direction to form a concave curved surface whose inside part is a light emitting surface, as an example. In this case, light source 120 in a form of a concave curved surface is realized by superimposing EL light emitting section 120*a* that is composed of an electroluminescence element and has elasticity on back plate 120*b* in a form of a concave curved surface.

Meanwhile, a curvature of the concave curved surface will be explained as follows, referring to FIG. 2 (*c*). In this case, a curved surface that agrees in terms of a shape with a circular arc representing a part of a circle (one-dot chain line) in a way that an original document reading-in position representing a center agrees with a center of a circle (circular arc) is assumed to be a curved surface of light source 120. Therefore, light source 120 is formed to be in a shape wherein a circular arc with a radius of curvature corresponding to a distance to a reading-in position is made to be a curved surface. The foregoing causes a state wherein illuminating light from light source 120 is converged to the vicinity of the reading-in position.

By constituting a light source so that the light source may become a concave curved surface whose inner side is a light emitting surface as stated above, it is possible to enhance light converging efficiency and to restrain a decline of light quantity on the periphery without using optical members other than a light source, such as a reflecting member and a light converging member, and without making a width and a length of the light source to be extremely large.

<Structure of Light Source (2)>

FIG. 3 (*a*) is a sectional view showing an arrangement of original document d, light source 120 and sensor 140, under the condition that the main-scanning direction is perpendicular to the page plane. In FIG. 3 (*a*), original document d is placed on or conveyed to glass G such as a contact glass or a platen glass. Then, a position for reading-in for an original document in the main-scanning direction is illuminated by light source 120 from the lower side of the glass G. Light reflected from a reading position for original document d is converted photoelectrically by sensor 140.

In this case, the light source 120 is composed as an illumination device when illuminating a reading position on a line in the main-scanning direction so that the light source has a folded plane whose inner side is a light emitting surface.

Light source 120 shown in each of FIG. 3 (*a*) and FIG. 3 (*b*) indicates one wherein the rectangular form is folded inward at folding lines parallel to the long side of the rectangular form to form a folded plane whose inner side is a light emitting surface, as an example. In this case, light source 120 in a form of a folded plane is realized by superimposing EL light emitting section 120*a* that is composed of an electroluminescence element and has elasticity on back plate 120*b* in a form of a folded plane.

Meanwhile, a curvature of a circular arc on the occasion wherein this folded plane is made to be close to a circular arc in terms of a shape will be explained as follows, referring to FIG. 3 (*c*). In this case, an original document reading-in position is made to be a center, and a folded plane that is close in terms of a shape to a circular arc representing a circle (one-dot chain line in FIG. 3 (*c*)) is assumed to be a folded plane of light source 120 so that the aforesaid center may be a center of a circle (circular arc). Therefore, light source 120 is formed to be in a shape that closely resembles a circular arc with a radius of curvature corresponding to a distance to a reading-in position. The foregoing causes a state wherein illuminating light from light source 120 is converged to the vicinity of the reading-in position.

By constituting a light source so that the light source may become a folded plane whose inner side is a light emitting surface as stated above, it is possible to enhance light converging efficiency and to restrain a decline of light quantity on the periphery without using optical members other than a light source, such as a reflecting member and a light converging member, and without making a width and a length of the light source to be extremely large.

<Structure of Light Source (3)>

FIG. 4 is a perspective view showing a form of light source 120 under the state wherein a light emitting surface faces upward. In FIG. 4, light source 120 shows an example wherein end portions (end portion in the main-scanning direction) of a rectangle form is made to be a concave curved surface so that a light emitting surface may be formed on the inside. In this case, light source 120 having a concave curved surface end portion is realized by superimposing EL light emitting section 120*a* that is composed of an electroluminescence element and has elasticity, on back plate 120*b* in a form to have a concave curved surface end portion.

Further, with respect to a concave curved surface in this end portion, when it is closely shaped to a circular arc whose center is on the end portion of a reading-out area in main scanning direction, a decline of light quantity on the reading-out area in main-scanning direction, can be restrained as shown in FIG. 5 (*b*) and FIG. 5 (*c*).

By constituting an end portion in the main-scanning direction of the light source so that it may become a concave curved surface whose inner side is a light emitting surface as stated above, it is possible to enhance light converging efficiency at the end portion in the main-scanning direction, and to control a decline of light quantity on the periphery, without using optical members other than a light source, such as a reflecting member and a light converging member and without making a width and a length of the light source to be extremely large.

<Structure of Light Source (4)>

FIG. 6 is a perspective view showing a form of light source 120 under the state wherein a light emitting surface faces upward. In this FIG. 6, light source 120 shows an example wherein an end portion (end portion in the main-scanning direction) on the long side part of a rectangular form is made to be a folded plane whose inner side is a light emitting surface. In this case, light source 120 having an end portion of a folded plane is realized by superimposing EL light emitting section 120*a* that is composed of an electroluminescence element and has elasticity, on back plate 120*b* in a form to have an end portion of a folded plane.

Further, with respect to a folded plane on this end portion, when it is closely shaped to a circular arc whose center is on the end portion of a reading-out area in main scanning direction (FIG. 7 (*a*)), a decline of light quantity on the end portion of a reading-out area in main-scanning direction, can be controlled as shown in FIG. 7 (*b*) and FIG. 7 (*c*).

By constituting an end portion in the main-scanning direction of the light source so that it may become a folded plane whose inner side is a light emitting surface as stated above, it is possible to enhance light converging efficiency at the end portion in the main-scanning direction, and to control a decline of light quantity on the periphery, without using optical members other than a light source, such as a reflecting member and a light converging member and without making a width and a length of the light source to be extremely large.

<Structure of Light Source (5)>

FIG. 8 (*a*) is a perspective view showing a form of light source 120 under the state wherein a light emitting surface faces upward. In this FIG. 8 (*a*), light source 120 shows an example wherein four corners (corner portions) of a rectangular form are made to be folded planes so that a light emitting surface may be on the inner side. In this case, light source 120 having end portions of folded planes is realized by superimposing EL light emitting section 120*a* that is composed of an electroluminescence element and has elasticity, on back plate 120*b* in a form to have end portions of folded planes. In this case, it is preferable that a size and an angle of each folded plane are adjusted in accordance with an extent of controlling a decline of light quantity on the periphery.

By constituting end portions of the light source so that they may represent four corners which are folded to be planes each having a light emitting surface formed on an inner side, it is possible to enhance light converging efficiency at end portions in the main-scanning direction, and it is possible to control a decline of light quantity on the periphery without using optical members other than a light source, such as a reflecting member and a light converging member and without making a width and a length of the light source to be extremely large.

<Structure of Light Source (6)>

FIG. 8 (*b*) is a perspective view showing the state of a light emitting surface that faces upward, concerning a form of light source 120. FIG. 8 (*b*) shows an example of light source 120 wherein four corners (corner portions) of a rectangular form for the light source (FIG. 3), which is folded inward at folding lines parallel to the long side of the rectangular form so that the inner side may represent a light emitting surface, are further folded to be folded planes so that the inside may represent a light emitting surface. Namely, this example is a combination of a form in FIG. 3 and a form in FIG. 8 (*a*).

In this case, light source 120 having end portions of folded planes is realized by superimposing EL light emitting section 120*a* that is composed of an electroluminescence element and has elasticity, on back plate 120*b* in a form to have folded planes. In this case, it is preferable that a size and an angle of each folded planes is adjusted in accordance with an extent of controlling a decline of light quantity on the periphery.

By constituting end portions of the light source so that long side portions and four corners may become folded planes each having a light emitting surface formed on an inner side, it is possible to enhance light converging efficiency at an end portion in the main-scanning direction, and it is possible to control a decline of light quantity on the periphery, without using optical members other than a light source, such as a reflecting member and a light converging member and without making a width and a length of the light source to be extremely large.

<Structure of Light Source (7)>

FIG. 8 (*c*) is a perspective view showing the state of a light emitting surface that faces upward, concerning a form of light source 120. FIG. 8 (*c*) shows an example of light source 120 wherein a rectangular form for the light source, which is folded inward at folding lines parallel to the short side of the rectangular form at near end portions of the long side (FIG. 6) so that an inside may represent a light emitting surface, are further folded at four corner portions to be folded planes so that the inside may represent a light emitting surface. Namely, this example is a combination of a form in FIG. 6 and a form in FIG. 8 (*a*).

In this case, light source 120 having end portions of folded planes is realized by superimposing EL light emitting section 120*a* that is composed of an electroluminescence element and has elasticity, on back plate 120*b* in a form to have a folded plane. In this case, it is preferable that a size and an angle of each folded planes are adjusted in accordance with an extent of controlling a decline of light quantity on the periphery.

By constituting end portions of the light source so that short side portions and four corners may become folded planes each having a light emitting surface formed on an inner side, it is possible to enhance light converging efficiency at an end portion in the main-scanning direction, and it is possible to control a decline of light quantity on the periphery, without using optical members other than a light source, such as a reflecting member and a light converging member and without making a width and a length of the light source to be extremely large.

<Structure of Light Source (8)>

FIG. 9 (*a*) is a perspective view showing the state of a light emitting surface that faces upward, concerning a form of light source 120. In the FIG. 9 (*a*), the light source 120 shows an example having the form resembling a rectangle (hereinafter referred to as a rectangular resemble form) where a width becomes wider toward both sides in the main-scanning direction, the width becomes narrow on the intermediate portion in the main-scanning direction, wherein the rectangular resemble form is bent in the short side direction to be a concaved curved surface so that a light emitting surface may be on the inner side.

In this case, light source 120 in a form of a concave curved surface is realized by superimposing EL light emitting section 120*a* that is composed of an electroluminescence element in the aforesaid shape and has elasticity on back plate 120*b* that is in the same form and is in a form of a concave curved surface.

In the meantime, it is preferable that a curvature of this concave curved surface is established in the same way as one shown in FIG. 2 (*c*). Due to this, illuminating light emitted from light source 120 enters the situation where the illuminating light is converged especially to the vicinity of reading-in position in the end portion in the main-scanning direction.

By constituting a light source so that it may take a concave curved surface wherein an end portion in the main-scanning direction is made to be wider in terms of a width, and a light emitting surface is on the inner side at the end portion, it is possible to enhance light converging efficiency and to restrain a decline of light quantity on the periphery without using optical members other than a light source, such as a reflecting member and a light converging member, and without making a width and a length of the light source to be extremely large.

<Structure of Light Source (9)>

FIG. 9 (*b*) is a perspective view showing the state of a light emitting surface that faces upward, concerning a form of light source 120. In the FIG. 9 (*b*), the light source 120 shows an example having the form resembling a rectangle (hereinafter referred to as a rectangular resemble form) where a width becomes wider toward both sides in the main-scanning direction, the width becomes narrow on the intermediate portion in the main-scanning direction, wherein the rectangular resemble form is folded at folding lines parallel to the long side of the rectangular resemble form at near portions of the long side so that a light emitting surface may be on the inner side.

In this case, light source 120 in a form of a folded plane is realized by superimposing EL light emitting section 120a that is composed of an electroluminescence element in the aforesaid shape and has elasticity on back plate 120b that is in the same form and is in a form of a concave curved surface.

Meanwhile, it is preferable that an angle of each folded plane is established in the same way as one shown in FIG. 3 (c). Due to this, illuminating light emitted from light source 120 enters the situation where the illuminating light is converged especially to the vicinity of reading-in position in the end portion in the main-scanning direction.

By constituting a light source so that it may take folded planes wherein an end portion in the main-scanning direction is made to be wider in terms of a width, and a light emitting surface is on the inner side at the end portion, it is possible to enhance light converging efficiency and to restrain a decline of light quantity on the periphery without using optical members other than a light source, such as a reflecting member and a light converging member, and without making a width and a length of the light source to be extremely large.

<Structure of Light Source (10)>

By combining the aforesaid structures (1)-(6) of the light source, it is also possible to use one wherein a shape thereof is a combination of a concave curved surface or a folded plane on the long side part of a rectangle, and a concave curved surface or a folded plane on the short side part of the rectangle, and a light emitting surface is formed on a inner side. This situation is shown in FIG. 10 (a) and FIG. 10 (b).

It is also possible to combine a light source wherein a width of the light source is wider toward end portions in the light source structures (7) and (8) with the aforesaid light source structures (1)-(6). This situation is shown in each of FIG. 10 (c) and FIG. 10 (d).

It is further possible to combine a light source wherein a width of the light source is wider toward end portions in the main-scanning direction in the light source structures (7) and (8) with one wherein the aforesaid light source structures (1)-(6) are combined. In this case, a concave curved surface or a folded plane on the long side part and a concave curved surface or a folded plane on the short side part may also be in the separated state (FIG. 10 (a)-FIG. 10 (d) and in the connected state. In this case, it is possible to realize light source 120 that is in a shape of a bag or a bathtub in which a width is broad at an aperture area and it is narrow in the inner part (bottom), and has a light emitting surface in the inner side, by connecting a concave curved surface or a folded plane on the long side part with a concave curved surface or a folded plane on the short side part.

Even by constituting a light source as in the aforesaid way, it is possible to enhance light converging efficiency and to restrain a decline of light quantity on the periphery without using optical members other than a light source, such as a reflecting member and a light converging member, and without making a width and a length of the light source to be extremely large.

By using the aforesaid respective light sources, it is possible to enhance light converging efficiency and to restrain a decline of light quantity on the periphery without using optical members other than a light source, such as a reflecting member and a light converging member, and without making a width and a length of the light source to be extremely large.

further, by using an electroluminescence element as light source 120, intensity of light emission can be changed only by adjustment of driving voltage, and light emission can be driven easily. Thus, as a result, gain control before A-D conversion and shading correction in an image processing section can be simplified, resulting in realization of improvement of image quality.

Other Embodiment (1)

In the aforesaid embodiments, a folded plane on which a light emitting surface is on the inner side, or a concave curved surface on which a light emitting surface is on the inner side has been constituted for both short sides or for both long sides. However, it is also possible to make one of short sides or one of long sides to be a curved surface or a folded plane, based on characteristics of a light source or an optical system.

Further, even in the occasion to make both sides to be a curved surface or a folded plane for a short side or a long side, it is also possible to make curved surfaces and folded planes which are different in both sides in terms of a curvature, an angle and a size, based on characteristics of a light source and of an optical system. It is further possible to combine a curved surface and a folded plane, in accordance with characteristic of a light source and an optical system.

Other Embodiment (2)

In the meantime, in the aforesaid embodiments, concerning a curvature of a concave curved surface, a curved surface that agrees in terms of a shape with a circular arc representing a part of a circle (one-dot chain line in FIG. 2 (c)) such that a curvature center of the curved surface agrees with a center of a circle (circular arc) has been assumed to be a curved surface of light source 120, to which however, the invention is not limited.

Namely, in the case of the aforesaid circle, light converged by a curved surface of light source 120 is gathered to the central portion of the aforesaid circle, and there may be caused possibility that a desired reading-in position cannot be illuminated, depending on a mounting error of light source 120.

Therefore, it is possible to estimate a range of a mounting error of light source 120, and thereby to change a circular arc shape to a paraboloidal shape so that reading-in position may be illuminated independently of a mounting position of a light source in the range of the mounting error.

Other Embodiment (3)

With respect to light source 120 above, it is not limited to one constituted to be separated from sensor 140 as shown in FIG. 1. Namely, light source 120 can be arranged in the sensor as a close contact image sensor.

Other Embodiment (4)

Meanwhile, in the aforesaid embodiments, an image reading apparatus has been explained specifically. However, even in the case of an image forming apparatus, a facsimile machine and a multifunctional machine which are equipped with the image reading apparatus, the same sort of excellent effects can be exhibited when the aforesaid control and processing are carried out.

What is claimed is:

1. An image reading apparatus for reading an original document comprising:
    a light source including a sheet-shaped light-emitting section which comprises an electroluminescence element, the light emitting section being configured to be a form of a rectangle whose long side is in a main-scanning direction of the original document, and is folded or bent in a short side direction to have a folded plane folded inward or a concave curved surface, and a light emitting surface being arranged inside the folded plane or the concave curved surface; and
    a reading element which receives light from the original document to read images while the light source illuminates a reading position of the original document along a main-scanning direction of the original document.

2. The image reading apparatus of claim 1, wherein the light emitting section is folded or bent to have the folded plane folded inward or the concave curved surface such that at least a part of end portions of the sheet-shaped light emitting section is made closer to the reading position of the original document.

3. An image reading apparatus for reading an original document comprising:
    a light source including a sheet-shaped light-emitting section which comprises an electroluminescence element, at least a part of end portions of the sheet-shaped light emitting section being configured to be a form of a rectangle whose long side is in a main-scanning direction of the original document, and is folded or bent in at least one end portion of a long side direction and short side direction to have a folded plane folded inward or a concave curved surface, and a light emitting surface being arranged inside the folded plane or the concave curved surface; and
    a reading element which receives light from the original document to read images while the light source illuminates a reading position of the original document along a main-scanning direction of the original document.

4. The image reading apparatus of claim 3, wherein the sheet-shaped light emitting section is configured to be longer than a reading region of the original document in the main-scanning direction, and an end portion of the light emitting section extended beyond the reading region of the original document is configured to be a folded plane folded inward or a concave curved surface, and the light emitting surface being arranged inside the folded plane or the concave curved surface.

5. A light source of an image reading apparatus for illuminating a reading position of the original document along a main-scanning direction of the original document, the light source comprising:
    a sheet-shaped light-emitting section which comprises an electroluminescence element, wherein the light emitting section being configured to be a form of a rectangle whose long side is in a main-scanning direction of the original document, and is folded or bent in a short side direction to have a folded plane folded inward or a concave curved surface, and a light emitting surface being arranged inside the folded plane or the concave curved surface.

6. The light source of claim 5, wherein the light emitting section is folded or bent to have the folded plane folded inward or the concave curved surface such that at least a part of end portions of the sheet of light emitting section is made closer to the reading position of the original document.

7. A light source of an image reading apparatus for illuminating a reading position of the original document along a main-scanning direction of the original document, the light source comprising:
    a sheet-shaped light-emitting section which comprises an electroluminescence element,
    wherein the light emitting section is configured to be a form of a rectangle whose long side is in a main-scanning direction of the original document, and is folded or bent in at least one end portion of a long side direction and short side direction to have a folded plane folded inward or a concave curved surface, at least a part of end portions of the light emitting section being configured to have the folded plane folded inward or the concave curved surface, and a light emitting surface being arranged inside the folded plane or the concave curved surface.

8. The light source of claim 7, wherein the sheet-shaped light emitting section is configured to be longer than a reading region of the original document in the main-scanning direction, and an end portion of the light emitting section extended beyond the reading region of the original document is configured to be a folded plane folded inward or a concave curved surface, and the light emitting surface being arranged inside the folded plane or the concave curved surface.

* * * * *